United States Patent [19]

Arakawa

[11] Patent Number: 4,621,196

[45] Date of Patent: * Nov. 4, 1986

[54] RADIATION IMAGE STORAGE PANEL

[75] Inventor: Satoshi Arakawa, Kanagawa, Japan

[73] Assignee: Fuji Photo Film Co., Ltd., Japan

[ * ] Notice: The portion of the term of this patent subsequent to Oct. 21, 2003 has been disclaimed.

[21] Appl. No.: 586,691

[22] Filed: Mar. 6, 1984

[30] Foreign Application Priority Data

Mar. 7, 1983 [JP] Japan .................................. 58-37838

[51] Int. Cl.$^4$ ......................... G01J 1/58; G01N 21/64; G01T 1/00

[52] U.S. Cl. .................................................. 250/483.1

[58] Field of Search ...................................... 250/483.1

[56] References Cited

U.S. PATENT DOCUMENTS 4,239,968 12/1980 Kotera et al. .................... 250/327.2

4,259,588 3/1981 Luckey et al. .................... 250/483.1

4,261,854 4/1981 Kotera et al. ................ 250/327.2 X 4,380,702 4/1983 Takahashi et al. ............... 250/327.2

*Primary Examiner*—James R. Hoffman

*Attorney, Agent, or Firm*—Gerald J. Ferguson, Jr.; James E. Bryan; Michael P. Hoffman

[57] ABSTRACT

A radiation image storage panel comprising a support, a phosphor layer which comprises a binder and a stimulable phosphor dispersed therein, and a light-reflecting layer provided between the support and the phosphor layer which contains a white pigment, characterized in that said white pigment comprises alkaline earth metal fluorohalide represented by the formula $M^{II}FX$, in which $M^{II}$ is at least one alkaline earth metal selected from the group consisting of Ba, Sr and Ca; and X is at least one halogen selected from the group consisting of Cl and Br.

7 Claims, 3 Drawing Figures

RADIATION IMAGE STORAGE PANEL

BACKGROUND OF THE INVENTION

1. Field of the Invention

This invention relates to a radiation image storage panel, and more particularly to a radiation image storage panel comprising a support, a phosphor layer which comprises a binder and a stimulable phosphor dispersed therein and a light-reflecting layer containing a white pigment provided between the support and the phosphor layer.

2. DESCRIPTION OF PRIOR ARTS

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for instance, in U.S. Pat. No. 4,239,968, has been recently paid much attention. In the radiation image recording and reproducing method, a radiation image storage panel comprising a stimulable phosphor (i.e., stimulable phosphor sheet) is used, and the method involves steps of causing the stimulable phosphor of the panel to absorb radiation energy having passed through an object or having radiated from an object; exciting the stimulable phosphor with an electromagnetic wave such as visible light and infrared rays (hereinafter referred to as "stimulating rays") to sequentially release the radiation energy stored in the stimulable phosphor as light emission (stimulated emission); photoelectrically converting the emitted light to electric signals; and reproducing the electric signals as a visible image on a recording material such as a photosensitive film or on a displaying device such as CRT.

In the above-described radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

The radiation image storage panel employed in the above-described radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (stimulated emission) when excited with stimulating rays after having been exposed to a radiation such as X-rays. In the radiation image recording and reproducing method, the radiation having passed through an object or having radiated from an object is absorbed by the phosphor layer of the radiation image storage panel in proportion to the applied radiation dose, and the radiation image of the object is recorded on the radiation image storage panel in the form of a radiation energy-stored image (latent image). The radiation energy-stored image can be released as stimulated emission (light emission) by applying stimulating rays to the panel, for instance, by scanning the panel with stimulating rays. The stimulated emission is then photoelectrically converted to electric signals, so as to produce a visible image from the radiation energy-stored image.

It is desired for the radiation image storage panel employed in the radiation image recording and reproducing method to have a high sensitivity and to provide an image of high quality (high sharpness, high graininess, etc.).

For enhancing the sensitivity of a radiation image storage panel, it has been known that a light-reflecting layer is provided between the support and the phosphor layer, for instance, by coating a dispersion comprising a binder and a white pigment on the support to form a light-reflecting layer and subsequently forming the phosphor layer on the light-reflecting layer. A radiation image storage panel having the light-reflecting layer containing a white pigment is disclosed in Japanese Patent Provisional Publication No. 56(1981)-12600 (corresponding to U.S. Pat. No. 4,380,702), in which titanium dioxide, white lead, zinc sulfide, aluminum oxide and magnesium dioxide are mentioned as examples of the employable white pigment.

As a stimulable phosphor employable for the radiation image storage panel, there has been proposed a divalent europium activated alkaline earth metal fluorohalide phosphor, which has been thought to be a particularly preferable phosphor from the viewpoint of the luminance of stimulated emission, etc. This phosphor shows a band spectrum of stimulated emission in the near ultraviolet to blue region with the emission peak at approx. 390 nm.

The white pigments other than magnesium oxide disclosed in the above-mentioned Japanese Patent Provisional Publication No. 56(1981)-12600 show considerably low reflectance in the near ultraviolet region, though which show high reflectance in the visible region. Accordingly, especially when a stimulable phosphor which emits light in the near ultraviolet region as well as the visible region (for instance, the divalent europium activated alkaline earth metal fluorohalide phosphor shows an emission intensity in the near ultraviolet region higher than that in the visible region) is employed for the radiation image storage panel, the light-reflecting layer containing the one of the above-mentioned white pigments other than magnesium oxide does not show sufficiently high reflection characteristics and the sensitivity of the panel is not enhanced to a satisfactory level.

Among the white pigments disclosed in the aforementioned Publication, titanium dioxide is industrially prepared by the sulfate process (Norway Method) or the chloride process, while magnesium oxide is industrially prepared by calcining magnesium carbonate or magnesium hydroxide. Thus prepared white pigments are in the form of particles having small size, usually not more than 1 μm. A pigment having such a small particle size is poor in dispersibility in a binder solution for the formation of light-reflecting layer, and the surface of the resulting light-reflecting layer tends to show poor smoothness, owing to the aggregation of the pigment particles on the surface of the layer. Such a light-reflecting layer having poor smoothness brings about difficulty in the formation of a phosphor layer with an even thickness thereon.

SUMMARY OF THE INVENTION

It is, accordingly, an object of the present invention to provide a radiation image storage panel having a light-reflecting layer containing a white pigment which has the excellent light-reflection characteristics and sufficient dispersibility.

The object is accomplished by the radiation image storage panel of the present invention comprising a support, a phosphor layer which comprises a binder and a stimulable phosphor dispersed therein, and a light-reflecting layer provided between the support and the phosphor layer which contains a white pigment, characterized in that said white pigment comprises alkaline earth metal fluorohalide represented by the formula $M^{II}FX$, in which $M^{II}$ is at least one alkaline earth metal selected from the group consisting of Ba, Sr and Ca; and X is at least one halogen selected from the group consisting of Cl and Br.

DETAILED DESCRIPTION OF THE INVENTION

Figure 1:
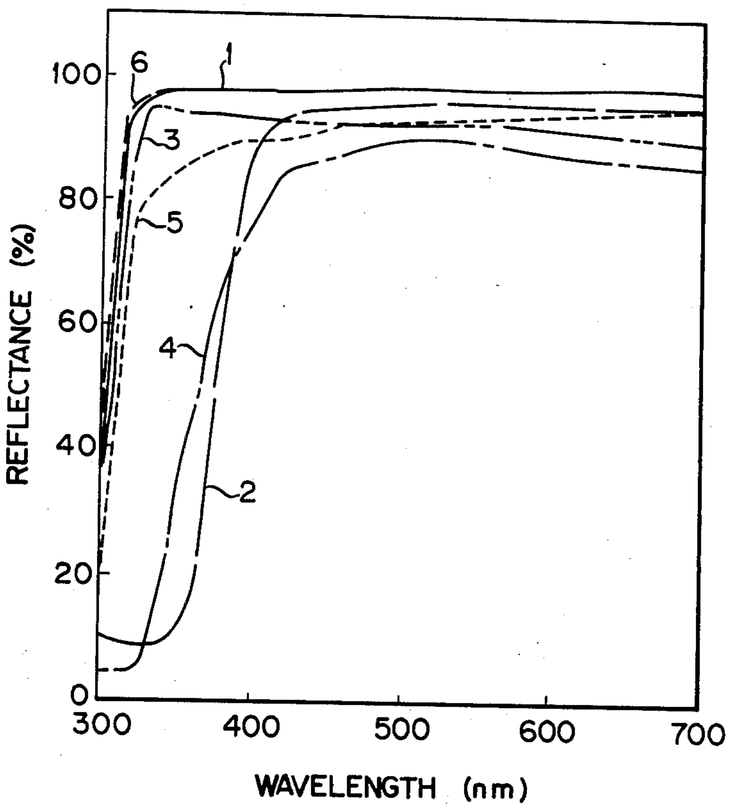
FIG. 1 shows a reflection spectrum of the lightreflecting layer containing BaFBr in the radiation image storage panel of the present invention (Curve 1), and reflection spectra of light-reflecting layers containing the known white pigments (Curves 2 to 6).

According to the present invention, the sensitivity of the radiation image storage panel is enhanced by providing a light-reflecting layer containing an alkaline earth metal fluorohalide having the above-mentioned formula on the support of the panel.

In the radiation image recording and reproducing method employing a radiation image storage panel comprising a phosphor layer which contains a stimulable phosphor, when a radiation having passed through an object or having radiated from an object enters the phosphor layer of the panel, the stimulable phosphor particles contained in the phosphor layer absorb the radiation energy to record on the phosphor layer a radiation energy-stored image corresponding to a radiation image of the object. Then, whan an electromagnetic wave (stimulating rays) with a wavelength in the visible to infrared region impinges upon the radiation image storage panel, the phosphor particles excited with the stimulating rays emit light (stimulated emission) in the near ultraviolet to visible region. The phosphor particles emit light in no special direction but in all directions, and a part of the light directly enters a photosensor such as a photomultiplier positioned close to the surface of the panel, in which the entering light is converted to electric signals. Thus, the aimed radiation energy-stored image is obtained in the form of a visible image.

Another part of the emitted light advancing towards the interface between the phosphor layer and the support (in the opposite direction of the photosensor) is reflected by the interface to enter the photosensor and to be converted to electric signals, except being absorbed by the support or passing through the support. Accordingly, the light to be converted to electric signals in the photosensor is sum of the direct light from the phosphor particles and the reflected light.

Therefore, unless a light-reflecting layer is provided between the support and the phosphor layer in a radiation image storage panel, most part of the emitted light advancing towards the interface between the phosphor layer and the support may be absorbed by the support to vanish or pass through the support to scatter away, so that the sensitivity of the panel is liable to decrease.

Particularly in the case that a phosphor showing stimulated emission in the near ultraviolet to visible region such as the above-described divalent europium activated alkaline earth metal fluorohalide phosphor is employed as a stimulable phosphor of the radiation image storage panel, a light-reflecting layer formed on a support is desired to have an excellent light-reflection characteristics in the near ultraviolet to visible region. That is, a white pigment employable for the lightreflecting layer is desired to have an excellent lightreflection characteristics in the near ultraviolet to visible region.

It is further desired that a white pigment employed for the light-reflecting layer is relatively large in the particle size to be sufficiently dispersible in a binder solution without occurrence of aggregation. As mentioned hereinbefore, a white pigment having a small particle size shows a low dispersibility in the binder sulution and the surface of the resulting light-reflecting layer is liable to have poor smoothness caused by aggregation of the white pigment. Such light-reflecting layer having poor smoothness of the surface brings about a difficulty in the formation of a phosphor layer with an even thickness thereon. Otherwise, for preventing the decrease of the dispersibility of white pigment in the binder solution to enhance the smoothness of the surface of lightreflecting layer, it is necessary to prepare a coating dispersion for the formation of the light-reflecting layer using a specific dispersing apparatus or to dry a coating layer thereof for a long period of time, and in such cases the procedure is very complicated.

The present inventors have found that the alkaline earth metal fluorohalide having the aforementioned formula shows the excellent light-reflection characteristics, that is, said fluorohalide shows the high reflectance in the near ultraviolet (up to the wavelength of 320 nm) to visible region, and that the alkaline earth metal fluorohalide shows the high dispersibility in the light-reflecting layer since it can be prepared in the form of particles with relatively large particle size.

More in detail, according to the studies of the present inventors, the decrease of sensitivity of a radiation image storage panel, arising from absorption by a support or from transmission through the support of the emitted light which advances towards the interface between a phosphor layer and the support, can be remarkably suppressed by providing a light-reflecting layer containing the alkaline earth metal fluorohalide on the support. Especially when a stimulable phosphor showing stimulated emission in the near ultraviolet to visible region such as the aforementioned divalent europium activated alkaline earth metal fluorohalide phosphor is employed in the phosphor layer, the sensitivity of the resulting radiation image storage panel can be prominently enhanced by providing a light-reflecting layer containing the alkaline earth metal fluorohalide.

It has been further found that the alkaline earth metal fluorohalide can be usually prepared in a relatively large particle size, and in the case of employing such alkaline earth metal fluorohalide as a white pigment in the light-reflecting layer, a light-reflecting layer showing the excellent dispersibility of the white pigment is obtained, so that a phosphor layer having even thickness can be formed on the light-reflecting layer.

Heretofore, it has been never known that the aforementioned alkaline earth metal fluorohalide can be employed as the light-reflecting material. The present inventors have studied on the divalent europium activated alkaline earth metal fluorohalide phosphor and found that the alkaline earth metal fluorohalide, namely, a host material of the phosphor, can be employed as a light-reflecting material suitably contained in the light-reflecting layer of the radiation image storage panel.

As described above, the radiation image storage panel of the present invention is enhanced in the sensitivity. This means that a thickness of the phosphor layer can be made small when the panel is so designed as to have the sensitivity at a predetermined level, and as a result, the panel can provide an image improved in the sharpness.

In the radiation image storage panel, the provision of a light-reflecting layer on the support makes possible to effectively prevent the phenomenon such as absorption of the emitted light by the support or scattering-away of the emitted light by transmission through the support, but in the same place, the light-reflecting layer tends to give the same effects to the stimulating rays. More in detail, a part of the stimulating rays impinged upon the panel pass through the phosphor layer without exciting the phosphor particles to reach the interface between the phosphor layer and the support, where the stimulating rays are reflected by the above-described light-reflecting layer to spread widely within the phosphor layer. As the result, the stimulating rays excite phosphor particles present outside of the phosphor particles to be excited, and accordingly, there is a tendency to decrease the sharpness of the image obtained by photoelectric conversion of the light emitted by the phosphor particles.

To enhance the quality of the image provided by the radiation image storage panel, particularly the sharpness of the image, there has been proposed, for instance, a radiation image storage panel a portion of which is colored with a colorant, as disclosed in Japanese Patent Provisional Publication No. 55(1980)-163500 (corresponding to U.S. Pat. No. 4,394,581 and European Patent Publication No. 80103133.7).

As the results of further studies, the present inventors have found that the sensitivity can be enhanced with little deterioration of the sharpness, by providing such a colored intermediate layer as selectively absorbs the stimulating rays on the light-reflecting layer containing the alkaline earth metal fluorohalide of the radiation image storage panel.

Accordingly, the present invention also provides a radiation image storage panel having an intermediate layer colored with a colorant capable of absorbing at least a portion of stimulating rays for exciting a stimulable phosphor contained in a phosphor layer between the light-reflecting layer containing an alkaline earth metal fluorohalide and the phosphor layer. The colorant employable for the intermediate layer is particularly preferred to have such a light-absorption characteristics that the mean absorption coefficient thereof in the wavelength region of the stimulating rays for the stimulable phosphor is higher than the mean absorption coefficient thereof in the wavelength region of the light emitted by the stimulable phosphor upon stimulation thereof.

The radiation image storage panel of the present invention having the preferable characteristics as described above can be prepared, for instance, in the following manner.

The support material employed in the present invention can be selected from those employed in the conventional radiogaphic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention.

On the support an adhesive layer may be provided by coating a polymer material such as gelatin over the surface of the support (on the light-reflecting layer side) so as enhance the bonding between the support and the light-reflecting layer provided thereon.

The light-reflecting layer, that is a characteristic requisite of the present invention, comprises a binder and a powdery alkaline earth metal fluorohalide dispersed therein.

The alkaline earth metal fluorohalide employable in the present invention is prepared, for instance, in the manner as described below.

An alkaline earth metal halide (at least one halide selected from the group consisting of barium bromide, barium chloride, strontium bromide, strontium chloride, calcium bromide and calcium chloride) is dissolved in a distilled water. To the solution is added an alkaline earth metal fluoride (at least one fluoride selected from the group consisting of barium fluoride, strontium fluoride and calcium fluoride) in an amount of the same molar as the above alkaline earth metal halide, and they are sufficiently mixed. The mixture is heated at an appropriate temperature (e.g. approx. 80° C.) under stirring to dryness under reduced pressure to obtain a powdery alkaline earth metal fluorohalide.

Thus prepared alkaline earth metal fluorohalide powder generally has a particle size ranging from 1 to 10 μm, and particularly approx. 90% of the powder has a particle size ranging from 2 to 5 μm.

As mentioned hereinbefore, titanium dioxide and magnesium oxide among the white pigments disclosed in the aforementioned Japanese Patent Provisional Publication No. 56(1981)-12600 comprise particles of a small size, and the particle sizes thereof are generally not more than 1 μm. On the other hand, the alkaline earth metal fluorohalide prepared by the above-described process comprises particles of a large and even size, so that it shows the excellent dispersibility in the binder solution. Accordingly, the employment of the alkaline earth metal fluorohalide is effective to provide a light-reflecting layer having highly smooth surface. Further, since the alkaline earth metal fluorohalide has a high covering power and a high refractive index, it can easily scatter the light by reflection or refraction, and therefore, the sensitivity of the resulting radiation image storage panel is remarkably enhanced.

Furthermore, the reflection spectrum of the alkaline earth metal fluorohalide is shown in the near ultraviolet to visible region (in the wavelength region longer than 320 nm), and particularly in the near ultraviolet region ranging from 320 to 450 nm, the alkaline earth metal fluorohalide has a high reflectance which is unobtainable for titanium dioxide, white lead, zinc sulfide and aluminum oxide disclosed in the above-mentioned Publication. The reflection spectrum (light-reflection characteristics) of the alkaline earth metal fluorohalide is almost the same as that of magnesium oxide disclosed in the Publication.

Accordingly, the alkaline earth metal fluorohalide is particularly suitable for employment as the light-reflecting material for the light-reflecting layer of the radiation image storage panel having a phosphor layer containing a stimulable phosphor which emits light having a wavelength in the near ultraviolet to visible region.

Among the above-described alkaline earth metal fluorohalide, particularly preferred in the present invention is a barium fluorohalide having the formula BaFX, in which X is at least one halogen selected from the group consisting of Cl and Br, from the viewpoint of the covering power or the like.

The light-reflecting layer can be prepared by the following procedures. The above-mentioned alkaline earth metal fluorohalide and a binder are added to an appropriate solvent, and they are sufficiently mixed to prepare a coating dispersion containing the alkaline earth metal fluorohalide homogeneously dispersed in the binder solution. The coating dispersion is evenly applied onto the surface of the support (or the surface of an adhesive layer provided on the support) to form a coating layer. Then the coating layer is heated to dryness so as to form the light-reflecting layer on the support. As described hereinbefore, the alkaline earth metal fluorohalide is in the form of particles with a relatively large size and is well dispersible in the binder solution, so that the light-reflecting layer formed on the support has a surface of high smoothness.

The binder and the solvent employable for the preparation of the light-reflecting layer can be selected from binders employable for the preparation of the phosphor layer which will be described hereinafter.

The mixing ratio between the binder and the alkaline earth metal fluorohalide to be contained in the coating dispersion is generally within the range of from 1:1 to 1:50, by weight. The binder is preferably contained in a small amount from the viewpoint of the light-reflection characteristics of the resulting light-reflecting layer, and considering easiness of the formation thereof as well as the light-reflection characteristics, the mixing ratio is preferably within the range of from 1:2 to 1:20, by weight. The thickness of the light-reflecting layer is preferably within the range of 5 to 100 μm.

The light-reflecting layer of the radiation image storage panel according to the present invention is required not only to efficiently reflect the light emitted by the stimulable phosphor so that the light advances towards the photosensor side, but also to efficiently reflect the stimulating rays entering the phosphor layer so that more of the stimulating rays serve for stimulating the phosphor. From this viewpoint, the reflectance of the light-reflecting layer is preferably as high as possible in the wavelength region of the light emitted by the stimulable phosphor as well as in the wavelength region of the stimulating rays for the stimulable phosphor, and generally the mean reflectances of the light-reflecting layer in the both wavelength regions are preferably not less than 50%. In the present invention, the reflectance means a reflectance value measured using an integrating-sphere spectrophotometer.

As described in Japanese Patent Application No. 57(1982)-82431 (corresponding to allowed U.S. patent application Ser. No. 496,278, now Pat. No. 4,575,635, and European Patent Publication No. 92241), the phosphor layer-side surface of the colored light-reflecting layer may be provided with protruded and depressed portions for enhancement of the sharpness of the image.

Other white pigments may be employed in conjunction with the alkaline earth metal fluorohalide as the light-reflecting material for the light-reflecting layer.

On the light-reflecting layer prepared as described above, a phosphor layer are formed. The phosphor layer comprises a binder and stimulable phosphor particles dispersed therein.

The stimulable phosphor, as described hereinbefore, gives stimulated emission when excited with stimulating rays after exposure to a radiation. In the viewpoint of practical use, the stimulable phosphor is desired to give stimulated emission in the wavelength region of 300–500 nm when excited with stimulating rays in the wavelength region of 400–850 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO.x$Al_2O_3$:Eu, in which x is a number satisfying the condition of $0.8 \leqq x \leqq 10$, and $M^{2+}$O.x$SiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

($Ba_{1-x-y}$, $Mg_x$,$Ca_y$)FX:a$Eu^{2+}$, in which X is at least one element selected from the group consisting of Cl and Br, x and y are numbers satisfying the conditions of $0 < x+y \leqq 0.6$, and $xy \neq 0$, and a is a number satisfying the condition of $10^{-6} \leqq a — 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

($Ba_{1-x}$,$M^{II}$x)FX:yA, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in Japanese Patent Provisional Publication No. 55(1980)-12145.

Among the above-described stimulable phosphors, the divalent europium activated alkaline earth metal fluorohalide phosphor and cerium activated rare earth oxyhalide phosphor are particularly preferred, because the light emitted thereby is efficiently reflected. However, the above-described stimulable phosphors are given by no means to restrict the stimulable phosphor employable in the present invention. Any other phosphors can be also employed, provided that the phosphor gives stimulated emission when excited with stimulating rays after exposure to a radiation.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the light-reflecting layer, for instance, by the following procedure.

In the first place, stimulable phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the light-reflecting layer to form a layer of the coating dispersion. The coating procedure can be carried out by a conventional method such as a method using a doctor blade, a roll coater or a knife coater.

After applying the coating dispersion to the light-reflecting layer, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 μm to 1 mm, and preferably from 50 to 500 μm.

The phosphor layer can be provided onto the light-reflecting layer by the methods other than that given in the above. For instance, the phosphor layer is initially prepared on a sheet material (false support) such as a glass plate, a metal plate or a plastic sheet using the aforementioned coating dispersion, and then thus prepared phosphor layer is superposed on the light-reflecting layer (provided on the genuine support) by pressing or using an adhesive agent.

The light-reflecating layer containing the alkaline earth metal fluorohalide has high smoothness of the surface as mentioned hereinbefore, so that the phosphor layer with an even thickness can be easily formed thereon by the above-described procedure.

For enhancing the sharpness of the image provided by the radiation image storage panel of the present invention, a colored intermediate layer may be provided between the light-reflecting layer and the phosphor layer, as mentioned above. The intermediate layer comprises a binder colored with a colorant capable of selectively absorbing the stimulating rays.

The colorant employable in the radiation image storage panel of the present invention is required to absorb at least a portion of the stimulating rays. The colorant preferably has the absorption characteristics that the mean absorption coefficient thereof in the wavelength region of the stimulating rays for the stimulable phosphor employed in the panel is higher than the mean absorption coefficient thereof in the wavelength region of the light emitted by said stimulable phosphor upon stimulation thereof. From the viewpoint of the sharpness of the image provided by the panel, it is desired that the mean absorption coefficient of the colorant in the wavelength region of the stimulating rays is as higher as possible. On the other hand, from the viewpoint of the sensitivity of the panel, it is desired that the mean absorption coefficient of the colorant in the wavelength region of the light emitted by the stimulable phosphor is as low as possible.

Accordingly, the preferred colorant depends on the stimulable phosphor employed in the radiation image storage panel. From the viewpoint of practical use, the stimulable phosphor is desired to give stimulated emission in the wavelength region of 300–500 nm when excited with stimulating rays in the wavelength region of 400–850 nm as described below. Employable for such a stimulable phosphor is a colorant having a body color ranging from blue to green so that the mean absorption coefficient thereof in the wavelength region of the stimulating rays for the phosphor is higer than the mean absorption coefficient thereof in the wavelength region of the light emitted by the phosphor upon stimulation and that the difference therebetween is as large as possible.

Examples of the colorant employed in the invention include the colorants disclosed in the above-mentioned Japanese Patent Provisional Publication No. 55(1980)-163500, that is: organic colorants such Zapon Fast Blue 3G (available from Hoechst AG), Estrol Brill Blue N-3RL (available from Sumitomo Cheimcal Co., Ltd.), Sumiacryl Blue F-GSL (available from Sumitomo Chemical Co., Ltd.), D &· C Blue No.1 (available from National Aniline), Spirit Blue (available from Hodogaya Chemical Co., Ltd.), Oil Blue No.603 (available from Orient Co., Ltd.), Kiton Blue A (available from Ciba-Geigy), Aizen Cathilon Blue GLH (available from Hodogaya Chemical Co, Ltd.), Lake Blue A.F.H. (available from Kyowa Sangyo Co., Ltd.), Rodalin Blue 6GX (available from Kyowa Sangyo Co., Ltd.), Primocyanine 6GX (available from Inahata Sangyo Co., Ltd.), Brillacid Green 6BH (available from Hodogaya Chemical Co., Ltd.), Cyanine Blue BNRS (available from Toyo Ink Mfg. Co., Ltd.), Lionol Blue SL (available from Toyo Ink Mfg. Co., Ltd.), and the like; and inorganic colorants such as ultramarine blue, cobalt blue, ceruleanblue, chromium oxide, $TiO_2$-ZnO-CoO-NiO pigment, and the like.

Examples of the colorant employable in the present invention also include the colorants described in the Japanese Patent Provisional Publication No. 57(1982)-96300 (corresponding to U.S. patent application Ser. No. 326,642 now U.S. Pat. No. 4,491,736), that is: organic metal complex salt colorants having Color Index No. 24411, No. 23160, No. 74180, No. 74200, No. 22800, No. 23150, No. 23155, No. 24401, No. 14880, No. 15050, No. 15706, No. 15707, No. 17941, No. 74220, No. 13425, No. 13361, No. 13420, No. 11836, No. 74140, No. 74380, No. 74350, No. 74460, and the like.

Among the above-mentioned colorants having a body color from blue to green, particularly preferred are the organic metal complex salt colorants which show no emission in the longer wavelength region than that of the stimulating rays as described in the latter Japanese Patent Provisional Publication No. 57(1982)-96300.

The binder employed in the formation of a colored intermediate layer can be selected from the above-described binders employable in the phosphor layer.

A colored intermediate layer can be formed on the light-reflecting layer by the folowing procedure: The colorant and binder are added to an appropriate solvent and they are sufficiently mixed to prepare a homogeneous coating dispersion (or solution) of the colorant in the binder solution. For the solvent, the above-mentioned solvents employable in the phosphor layer can be employed. The coating dispersion is uniformly coated on the light-reflecting layer and dried in the same manner as the formation of the phosphor layer, so as to form a colored intermediate layer.

The colored intermediate layer can be provided onto the light-reflecting layer by the methods other than that given in the above. For instance, the independently prepared colored intermediate layer can be superposed on the light-reflecting layer by using an adhesive agent.

As mentioned hereinbefore, the light-reflecating layer containing the alkaline earth metal fluorohalide has a surface of high smoothness, so that the colored intermediate layer with an even thickness can be easily formed thereon if it is provided between the light-reflecting layer and the phosphor layer.

The radiation image storage panel generally has a transparent film on a free surface of a phosphor layer to protect the phosphor layer from physical and chemical deterioration. In the radiation image storage panel of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approx. 3 to 20 μm.

The following examples further illustrate the present invention, but these examples are by no means understood to restrict the invention. In the following examples, the invention is illustrated with respect to a radiation image storage panel having a light-reflecting layer containing barium fluorobromide (BaFBr), but it has been confirmed that radiation image storage panels having a light-reflecting layer containing an alkaline earth metal fluorohalide other than BaFBr have almost the same results as given in Example 2.

EXAMPLE 1

333.19 g. of barium bromide ($BaBr_2.2H_2O$) was dissolved in 300 ml. of distilled water ($H_2O$) to prepare a solution. To the solution, 175.34 g. of barium fluoride ($BaF_2$) was added and mixed to give a suspension. The suspension was heated at 60° C. under reduced pressure and under stirring in a rotary evaporator to dryness, to obtain a barium fluorobromide powder (BaFBr) in which approx. 90% thereof had a particle size ranging from 2 to 5 μm.

To a mixture of the barium fluorobromide and a linear polyester resin were added methyl ethyl ketone and nitrocellulose (nitrification degree: 11.5%), and they were sufficiently stirred by means of homogenizer to prepare a homogeneous coating dispersion containing the barium fluorobromide and the binder in the ratio of 10:1 (fluorobromide : binder, by weight) and having a viscosity of 25-35 PS (at 25° C.).

Subsequently, the coating dispersion was applied to a plastic sheet placed horizontally on a glass plate by using a doctor blade. After the uniform coating was complete, the sheet having the coating dispersion was heated to dryness. Thus, a light-reflecting layer containing barium fluorobromide and having a thickness of 50 μm was formed on the sheet.

It was confirmed that the barium fluorobromide particles were sufficiently dispersed in the light-reflecting layer and aggregation of particles was not observed, and that the surface of the light-reflecting layer had high smoothness.

COMPARISON EXAMPLE 1

(a) A light-reflecting layer of the same thickness containing titanium dioxide was formed on the sheet in the same manner as described in Example 1 except that titanium dioxide (anatase-type $TiO_2$ with a particle size ranging from 0.10 to 0.25 μm; TITONE A-110 manufactured by Sakai Chemical Industry Co. Ltd.) was employed in place of barium fluorobromide.

(b) A light-reflecting layer of the same thickness containing white lead was formed on the sheet in the same manner as described in Example 1 except that commercially available white lead ($2PbCO_3.Pb(OH)_2$) was employed in place of barium fluorobromide.

(c) A light-reflecting layer of the same thickness containing zinc sulfide was formed on the sheet in the same manner as described in Example 1 except that commercially available zinc sulfide (ZnS) was employed in place of barium fluorobromide.

(d) A light-reflecting layer of the same thickness containing aluminum oxide was formed on the sheet in the same manner as described in Example 1 except that aluminum oxide ($Al_2O_3$, a mean particle size: 5 μm; manufactured by Buehler Ltd.) was employed in place of barium fluorobromide.

(e) A light-reflecting layer of the same thickness containing magnesium oxide was formed on the sheet in the same manner as described in Example 1 except that commercially available magnesium oxide (MgO; was employed in place of barium fluorobromide.

Among the prepared light-reflecting layers, both the light-reflecting layer containing $2PbCO_3.Pb(OH)_2$ (Com. Example 1-b) and light-reflecting layer containing ZnS (Com. Example 1-c) showed the dispersibility (of the white pigments) as high as that containing BaFBr of Example 1 did. and had the surface of satisfactory smoothness. However, in both the light-reflecting layer containing $TiO_2$ (Com. Example 1-a) and light-reflecting layer containing MgO (Com. Example 1-e), the aggregated particles of the white pigments were observed, and their surfaces had poor smoothness especially owing the aggregation of the particles in the vicinity of the surfaces thereof.

The light-reflecting layers prepred in Example 1 and Comprison Example 1 were measured on the light-reflectance by means of a spectrophotometer (Hitachi AutoRecording Sepectrophotometer type 330).

The results are graphically shown in FIG. 1.

In FIG. 1,

Curve 1 shows a reflection spectrum of the light-reflecting layer containing BaFBr (Example 1), Curve 2 shows a reflection spectrum of the light-reflecting layer containing $TiO_2$ (Com. Example 1-a), Curve 3 shows a reflection spectrum of the light-reflecting layer containing $2PbCO_3.Pb(OH)_2$ (Com. Example 1-b), Curve 4 shows a reflection spectrum of the light-reflecting layer containing ZnS (Com. Example 1-c), Curve 5 shows a reflection spectrum of the light-reflecting layer containing $Al_2O_3$ (Com. Example 1-d), and Curve 6 shows a reflection spectrum of the light-reflecting layer containing MgO (Com. Example 1-e).

As is evident from the results indicated by Curves 1 to 6 shown in FIG. 1, the light-reflecting layer containing BaFBr of the radiation image storage panel according to the present invention shows the reflection spectrum in the wavelength region shorter than those of the light-reflecting layers containing $TiO_2$, $2PbCO_3.Pb(OH)_2$, ZnS and $Al_2O_3$. Moreover, the reflection spectrum of the light-reflecting layer containing BaFBr is similar to that of the light-reflecting layer containing MgO, and has the excellent reflection characteristics in the near ultraviolet to visible ragion ranging from 320 to 450 nm.

EXAMPLE 2

To a mixture of the particulate barium fluorobromide prepared in Example 1 and polyurethane were added toluene and ethanol, and they were sufficiently stirred by means of homogenizer to prepare a homogeneous coating dispersion containing the barium fluorobromide and the binder in the ratio of 10:1 (fluorobromide : binder, by weight) and having a viscosity of 25–35 PS (at 25° C.).

Subsequently, the coating dispersion was applied onto a polyethylene terephthalate sheet (support, thickness: 250 μm) placed horizontally on a glass plate by using a doctor blade. After the uniform coating was complete, the support having the coating dispersion was heated at a temperature gradually rising from 25° to 100° C. Thus, a light-reflecting layer having a thickness of approx. 100 μm was formed on the support. The barium fluorobromide particles were sufficiently dispersed in the light-reflecting layer and the surface thereof had high smoothness.

Then, to a mixture of a divalent europium activated alkaline earth metal fluorobromide ($BaFBr:Eu^{2+}$) phosphor particles and a linear polyester resin were added to methyl ethyl ketone and nitrocellulose (nitrification degree: 11.5%), to prepare a dispersion containing the phosphor particles and the binder in the ratio of 20:1 (phosphor : binder, by weight). Tricresyl phosphate, nbuthanol and methyl ethyl ketone were added to the dispersion and the mixture was sufficiently stirred by means of a propeller agitater to obtain a homogeneous coating dispersion having a viscosity of 25–35 PS (at 25° C.).

The coating dispersion was applied onto the light-reflecting layer in the same manner as described above to form a phosphor layer having a thickness of approx. 250 μm.

On the phosphor layer was placed a polyethylene terephthalate transparent film (thickness: 12 μm; provided with a polyester adhesive layer on one surface) to combine the film and the phosphor layer with the adhesive layer. Thus, a radiation image storage panel consisting essentially of a support, a light-reflecting layer, a phosphor layer and a transparent protective film was prepared.

Further, a variety of radiation image storage panels were prepared, varying the thickness of phosphor layer within the range of 100–400 μm. The prepared panels were named Panel A.

COMPARISON EXAMPLE 2

As a support, a polyethylene terephthalate sheet containing carbon black (thickness: 250 μm) was prepared.

The procedure of Example 1 was repreated except that the phosphor layer was directly provided on the so prepared support without provision of the light-reflecting layer, to prepare a variety of radiation image storage panels consisting essentially of a support, a phosphor layer of a different thickness and a transparent protective film. The so prepared panels were named Panel B.

The radiation image storage panels (Panels A and B) prepared as described above were evaluated on the sensitivity thereof and the sharpness of the image provided thereby according to the following test.

(1) Sensitivity

The radiation image storage panel was exposed to X-rays at voltage of 80 KVp and subsequently scanned with a He-Ne laser beam (wavelength: 632.8 nm) to excite the phosphor particles contained in the panel. The light emitted by the phosphor layer of the panel was detected by means of the above-mentioned photosensor to measure the sensitivity thereof.

(2) Sharpness of image

The radiation image storage panel was exposed to X-rays at voltage of 80 KVp through an MTF chart and subsequently scanned with a He-Ne laser beam (wavelength: 632.8 nm) to excite the phosphor particles contained in the panel. The light emitted by the phosphor layer of the panel was detected and converted to electric signals by means of a photosensor (a photomultiplier having spectral sensitivity of type S-5). The electric signals were reproduced by an image reproducing apparatus to obtain a radiation image of the MTF chart as a visible image on a displaying apparatus, and the modulation transfer function (MTF) value of the visible image was determined. The MTF value was given as a value (%) at the spacial frequency of 2 cycle/mm.

Figure 2:
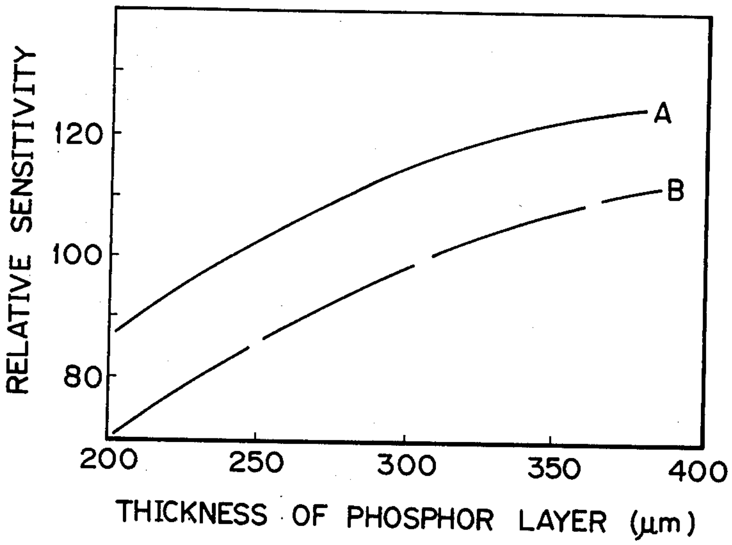
FIG. 2 graphically illustrates a relationship between a thickness of the phosphor layer and a relative sensitivity in the radiation image storage panel of the present invention (Curve A) and a relationships therebetween in the known radiation image storage panel (Curve B).
Figure 3:
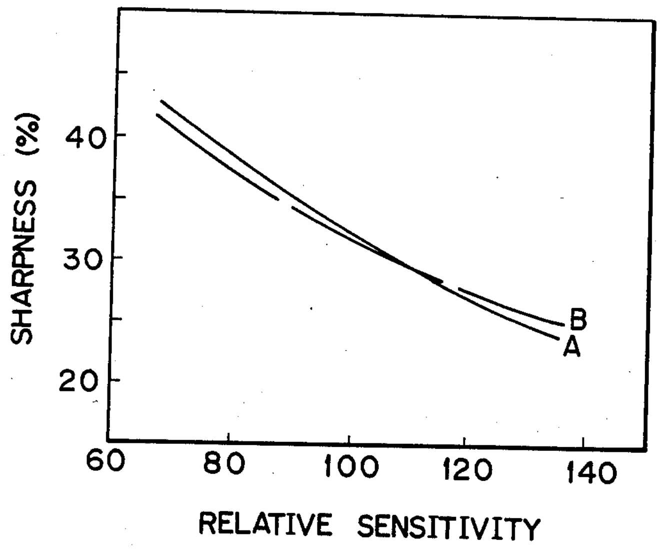
FIG. 3 graphically illustrates relationships between a relative sensitivity and a sharpness in the radiation image storage panels shown in FIG. 2.

The results of the evaluation on the radiation image storage panels are graphically shown in FIG. 2 and FIG. 3.

In FIG. 2,

Curve A shows a relationship between a thickness of phosphor layer and a sharpness with respect to Panel A, in which the light-reflecting layer containing barium fluorobromide is provided, and Curve B shows a relationship between a thickness of phosphor layer and a sharpness with respect to Panel B, in which the support contains carbon black and the light-reflecting layer is not provided.

In FIG. 3,

Curve A shows a relationship between a relative sensitivity and a sharpness with respect to Panel A, and Curve B shows a relationship between a relative sensitivity and a sharpness with respect to Panel B.

As is evident from the results indicated by Curves A and B shown in FIG. 2, the radiaition image storage panel of the present invention having the light-reflecting layer containing barium fluorobromide shows the higher sensitivity than that not having the light-reflecting layer.

Moreover, as is evident from the results indicated by Curves A and B shown in FIG. 3, the radiaition image storage panel of the present invention having the lightreflecting layer containing barium fluorobromide provides an image of as the same sharpness as that having the support containing carbon black for enhancing the sharpness, when the comparison is made on the same sensitivity level basis.

What is claimed is:

1. A radiation image storage panel comprising a support, a phosphor layer which comprises a binder and a stimulable phosphor dispersed therein, and a light-reflecting layer provided between the support and the phosphor layer which contains a white pigment, characterized in that said white pigment comprises alkaline earth metal fluorohalide represented by the formula $M^{II}FX$, in which $M^{II}$ is at least one alkaline earth metal selected from the group consisting of Ba, Sr and Ca; and X is at least one halogen selected from the group consisting of Cl and Br.

2. The radiation image storage panel as claimed in claim 1, in which said light-reflecting layer containing the alkaline earth metal fluorohalide has mean reflectance of not less than 50% both in the wavelength region of the light emitted by the stimulable phosphor upon stimulation thereof and in the wavelength region of the stimulating rays for the stimulable phosphor.

3. The radiation image storage panel as claimed in claim 1, in which said stimulable phosphor emits light in the near ultraviolet to visible region.

4. The radiation image storage panel as claimed in claim 3, in which said stimulable phosphor which emits light in the near ultraviolet to visible region is a divalent europium activated alkaline earth metal fluorohalide phosphor.

5. The radiation image storage panel as claimed in any one of claims 1 through 4, in which said alkaline earth metal fluorohalide is a barium fluorohalide represented by the formula BaFX, in which X is at least one halogen selected from the group consisting of Cl and Br.

6. The radiation image storage panel as claimed in any one of claims 1 through 4, in which an intermediate layer colored with a colorant capable of absorbing at least a portion of the stimulating rays for the stimulable phosphor is provided between said light-reflecting layer containing the alkaline earth metal fluorohalide and said phosphor layer.

7. The radiation image storage panel as claimed in claim 6, in which said colorant has such a light-absorption characteristics that the mean absorption coefficient thereof in the wavelength region of the stimulating rays for the stimulable phosphor is higher than the mean absorption coefficient thereof in the wavelength region of the light emitted by the stimulable phosphor upon stimulation.

* * * * *